Feb. 21, 1961  J. F. BRACESCO  2,972,149
MUD GUARD FOR TRAILER TRUCK TRACTOR
Filed March 10, 1958
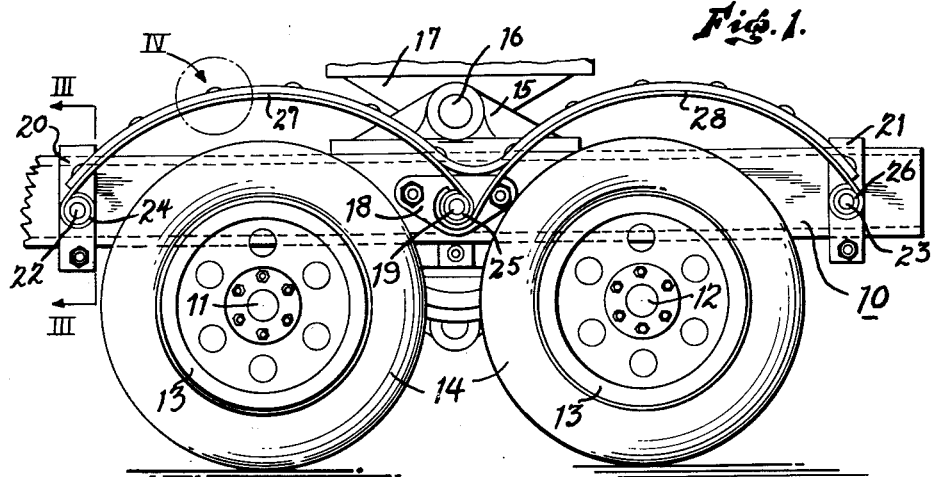
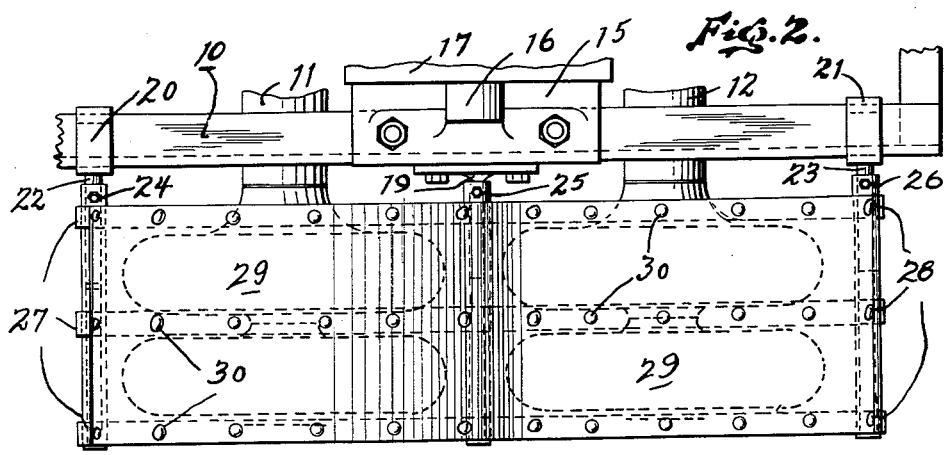
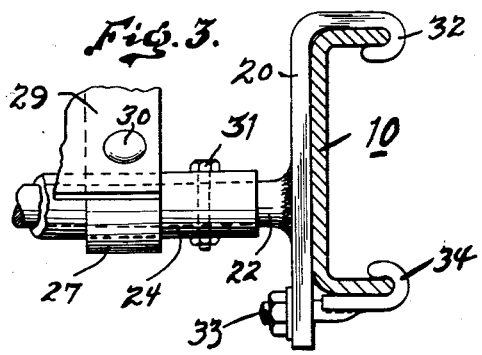
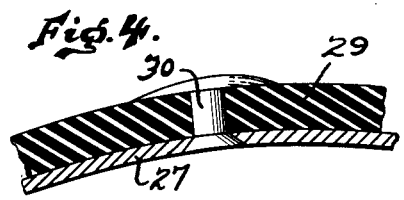
INVENTOR.
JOHN F. BRACESCO.
BY
Wm H. Atkinson
ATTORNEY

United States Patent Office 2,972,149
Patented Feb. 21, 1961

2,972,149

MUD GUARD FOR TRAILER TRUCK TRACTOR

John F. Bracesco, Millbrae, Calif.

Filed Mar. 10, 1958, Ser. No. 720,433

4 Claims. (Cl. 280—152)

My present invention relates to automotive trucking vehicles and more particularly to an improved mud guard or fender construction for mounting over the driving wheels of a heavy duty transport trailing tractor.

An object of the invention is to provide a practical and inexpensive mud guard or fender for mounting over the traction wheels of a transport tractor in a novel and effective manner.

Another object of the invention is to provide a mud guard or fender of novel construction having adjustable characteristics which will lend itself to mounting upon different frame structures and wheel arrangements with a minimum of bracing.

Another object of the invention is to provide a mud guard or fender against which gravel and like particles thrown up by the wheels will be directed against a non-metallic sound deadening area of the fender and thus eliminate the annoying noise such as would result from the use of a metallic mud guard.

Other objects and advantages will be in part evident to those skilled in the art and in part pointed out hereinafter in connection with the accompanying drawing, wherein there is shown by way of illustration and not of limitation a preferred embodiment of the invention.

In the drawing wherein like numerals refer to like parts throughout the several views:

Figure 1 is a fragmentary side view showing the rear end of a trailer tractor unit employing a four wheel assembly with eight tires, Figure 2 is a fragmentary plan view of the showing in Figure 1, Figure 3 is a fragmentary view taken along line III—III of Figure 1, showing a detail for the mounting of the fender, and Figure 4 is an enlarged fragmentary sectional view of the fender taken at the point IV of Figure 1.

In the field for which my present invention is particularly well adapted and particularly as related to trailing truck tractors, the problem of providing mud guards and/or fenders over the traction wheels of the tractor element is generally left to the buyer. This, from the manufacturers point of view, may be explained by the fact that these tractor units are interchangeable with different types of truck bodies and trailing units. In the case of enclosed truck bodies, the general outline and design thereof places the forward end of the trailing truck unit over the traction wheels of the tractor unit. This gives very little clearance in such manner that there is practically no necessity for a mud guard as the trailing truck body overhangs the traction wheels. However, in the event that the traction unit is used in connection with a low bed trailer or commodity transporting trailer of the type provided with a forwardly projected tongue, there results a condition in which the wheels of the tractor unit are exposed and if no mud guard or fender is provided thereover, mud and other debris will be thrown up in advance of the trailing unit and over the trailing load. It is to remedy this condition that my invention will find its principal field of usefulness.

For a detailed description of the invention, reference is now had to the accompanying drawing wherein the numeral 10 designates the frame of a power driven tractor unit of the eight wheel type having a forward axle 11 and a rearward axle 12 upon each of which four wheels 13 carrying tires 14 are mounted. Centrally upon the frame 10 and at a point above the axles 11 and 12 there is a trunnion 15 having a lateral shaft 16 upon which a stanchion carrying member 17 is adapted to rock. Where a flat bed trailer of the type referred to, having a forwardly projecting tongue is connected with the traction unit, the tongue will be connected to the stanchion (not shown) for turning movement in a horizontal plane as is well understood in the art when curves and corners are traversed. The frame 10 as shown is of conventional construction in that the sides thereof are formed of channel shaped steel beams having a substantially flat exterior vertical surface with inwardly extending flanges. At the point where the trunnion 15 is secured between the sides of the frame 10, there is generally found a number of extending studs of bolts by which the trunnion is secured between the sides of the frame and where such studs or bolts are present, I provide a plate 18 with properly located holes in such a manner that these same studs or bolts may be used as a means for securing the plate 18 against the outer side of the frame 10 at this point. If no such studs or bolts are present, I may drill the frame 10 and provide separate bolts. The plate 18, in accordance with the invention, carries a stud-like member 19 that projects horizontally therefrom substantially centrally between the treads of the tires 14. At points forward and to the rear of the axles 11 and 12, there are provided clamps or clips 20 and 21 each of which respectively carry outwardly and horizontally extending stud-like members 22 and 23. These clamps or clips 20 and 21 are of special construction and are adjustable longitudinally along the sides of the frame 10 as will hereinafter appear. In this manner, there is provided three longitudinally spaced horizontally extending stud-like members 19, 22 and 23 which in practice will project outwardly in parallel relation with the axles 11 and 12 for a suitable distance and provide an inexpensive and practical support for a mud guard or fender such as is here contemplated.

To further provide for and facilitate the mounting of and the removal of my improved fender or mud guard from the tractor unit as conditions require, the mud guard or fender unit carries three tubular members 24, 25 and 26 into which the projecting ends of the stud-like members 22, 19 and 23 respectively project when the mud guard is in place upon the tractor. Connected between these tubular members, I have shown three spring steel straps 27 which are looped around and secured in laterally spaced relation along the length of the tubular members 24 and 25 and between the tubular members 25 and 26, I have shown additional spring steel straps 28 that are likewise laterally spaced and looped at their ends and secured to the tubular members 25 and 26. These spring steel straps 27 and 28 are bowed upwardly in spaced relation with the treads of the tires 14 of the traction unit and upon these straps there is secured a non-metallic sound deadening sheet 29 of rubber or like material. One such material which I have found available is a length of rubber belting which may be had in various widths and thicknesses. In practice, I have found that such material having a thickness of from ⅜″ to ½″ is practical. This sound deadening material 29, as is more clearly shown in Figure 4 of the drawing, is secured upon the spring steel straps 27 and 28 by means of rivets 30 having a relatively large rounded head.

As will be noted upon reference to Figure 2 and 3 of the drawing, the tubular stud engaging members 24, 25 and 26 of the fender assembly extend inwardly beyond the inner edge of the mud guard forming material 29 and provide a means by which these tubular members are secured upon the studs 19, 22 and 23 by means of bolts passing therethrough as shown in Figure 3. In this latter figure of the drawings, it will be also noted that the clips 20 and 21 are provided with a flange having an inturned end to provide a hook-like clip 32 that will extend about the upper flange of the channel members of which the frame 10 is constructed. At the lower end of these clips 20 and 21, there is a hook or clip carrying bolt 33 having a hook-like extension 34 that engages with the lower flange of the channel member forming the sides of the frame 10.

With this arrangement, it will be readily seen that when a mud guard or fender is required upon a tractor unit as here described, it will be a simple matter to initially mount a fender thereon by securing the plate 18 to the frame and then attaching the clips 20 and 21 to the frame at properly spaced locations. Then as a subsequent step, the fender constructed as above with its spring steel straps 27 and 28 with the three tubular members 24, 25 and 26 can be easily slipped over the stud forming members 19, 22 and 23. From this, it will be seen that should a condition arise as where not required, the mud guard forming portion may be removed from the stud-like members while at the same time these stud-like members may be allowed to remain on the tractor unit for use at some future time when conditions would require a mud guard. By constructing the straps 27 and 28 which support the sound deadening mud guard from material 29 of spring steel, it is possible to vary the curvature and clearance between the tires 14 of the traction unit and the inner surface of the mud guard by simply changing the location of the studs 22 and 23 with respect to the stud 19. At this point, it should also be pointed out that the mud guard supporting straps 27 and 28 are so spaced laterally with respect to the wheels 13 that mud or other debris thrown up thereby will strike the sound deadening material 29 at points between the supporting straps 27 and 28. With this arrangement in addition to providing an effective means for preventing of the throwing of mud or other debris, the mud guard will also eliminate the noise which generally accompanies the throwing of gravel from the road against what might otherwise be a metallic mud guard or fender.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a mud guard for the traction wheels of a transport tractor, the combination of an automotive tractor unit having a horizontal frame with pairs of traction wheels disposed outwardly on each side and at the trailing end thereof, a stud-like member mounted upon and extending laterally from the side of said frame between the vertical centers of said pairs of traction wheels, two additional stud-like members secured to and extending from the sides of said frame in spaced parallel relation with said first stud-like member and to the front and rear of said pairs of traction wheels, a plurality of spring steel supporting members secured at their ends in laterally spaced relation and extending between said first stud-like member and said additional stud-like members, said supporting members being bowed upwardly under stress and over said traction wheels as determined by the spacing between said first stud-like member and said additional stud-like members, and a flexible sheet of sound deadening material secured upon said spaced guard supporting members as a mud deflecting guard over each of said pairs of traction wheels.

2. In a mud guard for the traction wheels of a transport tractor, the combination of an automotive tractor unit having a horizontal frame with two pairs of traction wheels disposed outwardly on each side and at the trailing end thereof, a stud-like member mounted upon and extending laterally from the side of said frame between the vertical centers of said pairs of traction wheels, two additional stud-like members secured to and extending from the sides of said frame in spaced parallel relation with said first stud-like member and to the front and rear of said pairs of traction wheels, bowed spring members secured in laterally spaced relation at their ends between said first stud-like member and each of said additional stud-like members, said spring members being bowed upwardly and over said traction wheels, a flexible sheet of non-metallic material secured intermediate its ends to said bowed spring members as a guard over said pairs of traction wheels, and means for adjustably securing said additional stud-like members upon said frame with respect to said first stud-like member, whereby the location of said guard may be varied with respect to the centers of said wheels.

3. In a mud guard for the traction wheels of a transport tractor, the combination of an automotive tractor unit having a horizontal frame with two pairs of traction wheels disposed outwardly at the sides and trailing end thereof, a stud-like member mounted upon and extending laterally from the side of said frame between the vertical centers of said traction wheels, two additional stud-like members secured to and extending from the sides of said frame in spaced parallel relation with said first stud-like member, one at the front and the other at the rear of said pairs of traction wheels, spring straps secured at their ends in laterally spaced relation between said first stud-like member and each of said additional stud-like members and curved upwardly and over said traction wheels, a flexible sheet of non-metallic material secured to said spring straps between said first stud-like member and said additional stud-like members, and means for securing said additional stud-like members upon said frame at any desired point with respect to said first stud-like member to thus vary the curvature of said spring straps.

4. In a mud guard for the traction wheels of a transport tractor, the combination of an automotive tractor unit having a horizontal frame with two pairs of traction wheels disposed outwardly at the sides and trailing end thereof, a stud-like member mounted upon and extending laterally from the side of said frame between the vertical centers of said traction wheels, two additional stud-like members secured to and extending from the sides of said frame in spaced parallel relation with said first stud-like member, one at the front and the other at the rear of said pairs of traction wheels, a tubular member removably mounted upon each of said studs and extending outwardly from said frame, spring straps secured at their ends in laterally spaced relation upon said tubular members and extending between said first stud-like member and each of said additional stud-like members, a flexible sheet of non-metallic material secured to said spring straps between said first stud-like member and said additional stud-like members, and means for securing said additional stud-like members upon said frame at any desired point with respect to said first stud-like member to thus vary the curvature of said spring straps.

References Cited in the file of this patent
UNITED STATES PATENTS

| | | |
|---|---|---|
| 2,311,941 | Gustafson | Feb. 23, 1943 |
| 2,679,403 | Howard et al. | May 25, 1954 |
| 2,771,304 | La Pere | Nov. 20, 1956 |

FOREIGN PATENTS

| | | |
|---|---|---|
| 684,197 | Great Britain | Dec. 10, 1952 |